(12) United States Patent
Qian et al.

(10) Patent No.: US 7,415,099 B2
(45) Date of Patent: Aug. 19, 2008

(54) METHOD AND DEVICES FOR MONITORING SUBSCRIBERS OF A TELECOMMUNICATIONS NETWORK DURING PARTICIPATION IN GROUP CALL CONNECTIONS

(75) Inventors: Faqiang Qian, Vienna (AT); Bernhard Spalt, Vienna (AT)

(73) Assignee: Nokia Siemens Networks GmbH & Co. KG, Munich (DE)

( * ) Notice: Subject to any disclaimer, the term of this patent is extended or adjusted under 35 U.S.C. 154(b) by 440 days.

(21) Appl. No.: 10/558,900

(22) PCT Filed: May 26, 2004

(86) PCT No.: PCT/EP2004/050921

§ 371 (c)(1),
(2), (4) Date: Dec. 2, 2005

(87) PCT Pub. No.: WO2004/107719

PCT Pub. Date: Dec. 9, 2004

(65) Prior Publication Data

US 2006/0285649 A1  Dec. 21, 2006

(30) Foreign Application Priority Data

Jun. 2, 2003 (DE) ................. 103 24 872

(51) Int. Cl.
*H04M 1/24* (2006.01)
*H04M 3/08* (2006.01)
*H04M 3/22* (2006.01)

(52) U.S. Cl. ............... 379/35; 379/9.02; 379/32.01; 455/518

(58) Field of Classification Search ............. 379/7, 379/9, 9.02, 10.01, 32.01, 35; 704/231, 236, 704/246, 270.1; 455/422.1, 426, 450, 518–521; 370/260, 263, 266
See application file for complete search history.

(56) References Cited

U.S. PATENT DOCUMENTS 5,230,078 A * 7/1993 Varela et al. ............. 455/67.11

(Continued)

FOREIGN PATENT DOCUMENTS

WO  WO 03/069947 A1  8/2003

OTHER PUBLICATIONS

"Digital cellular telecommunications system (Phase 2+); Voice Group Call Service (VGCS); Stage 1 (3GPP TS 42.068 version 5.0.1 Release 5); ETSI TS 142 068" ETSI Standards, European Telecommunications Standards Institute; Sophia-Antipo, France, vol. 3-SA1, No. V501, Oct. 2002, XP 014010440; ISSN: 0000-0001.

(Continued)

*Primary Examiner*—Binh K Tieu
(74) *Attorney, Agent, or Firm*—Bell, Boyd & Lloyd LLP

(57) ABSTRACT

The invention relates to a gas-insulated bus bar component comprising a grounded housing that is filled with protective gas and at least one bus bar conductor, which extends in the longitudinal direction of the housing and is supported on said housing by means of insulating bus bar supports. According to the invention, each bus bar conductor is connected to a disconnecting switch that is insulated by protective gas. The aim of the invention is to provide a component of this type, which can be simply connected to and disconnected from an air-insulated conductor, even when operational. To achieve this, the disconnecting switch is located in an outdoor bushing that is fixed to the housing.

19 Claims, 7 Drawing Sheets

U.S. PATENT DOCUMENTS

| | | | | |
|---|---|---|---|---|
| 5,594,948 | A | * | 1/1997 | Talarmo et al. ............. 455/518 |
| 5,854,825 | A | * | 12/1998 | Mukaihara et al. .......... 379/309 |
| 5,930,698 | A | * | 7/1999 | Bertacchi .................... 455/405 |
| 6,141,548 | A | | 10/2000 | Blanchard et al. |
| 6,370,113 | B1 | * | 4/2002 | Paradiso et al. ............. 370/225 |
| 6,449,491 | B1 | * | 9/2002 | Dailey ........................ 455/518 |
| 6,529,486 | B1 | * | 3/2003 | Barnes et al. ............... 370/327 |
| 6,735,564 | B1 | * | 5/2004 | Puhakainen ................. 704/246 |
| 6,982,961 | B2 | * | 1/2006 | Refai et al. ................. 370/265 |
| 7,257,199 | B2 | * | 8/2007 | Carlson et al. ................ 379/35 |

OTHER PUBLICATIONS

"Digital cellular telecommunications system (Phase 2+); Voice Group Call Service (VGCS); Stage 2 (3GPP TS 43.068 version 5.2.0 Release 5); ETSI TS 143 068" ETSI Standards, European Telecommunications Standards Institute; Sophia-Antipo, France, vol. 3-CN1, No. V520, Dec. 2002, XP 014010506; ISSN:0000-0001.

"Digital cellular telecommunications system (Phase 2+); Lawful Interception; Stage 1 (3GPP TS 42.033 version 5.0.0 Release 5); ETSI TS 142 033" ETSI Standards, European Telecommunications Standards Institute; Sophia-Antipo, France, vol. 3-SA3; Nr. V500, Jun. 2002, XP 014010433; ISSN: 0000-0001.

"Digital cellular telecommunications system (Phase 2+); Lawful Interception; Stage 2 (3GPP TS 43.033 version 5.0.0 Release 5); ETSI TS 143 033" ETSI Standards, European Telecommunications Standards Institute; Sophia-Antipo, France, vol. 3-SA3, Nr. V500, Jun. 2002, XP 014010468; ISSN 0000-0001.

* cited by examiner

FIG 1  Group call

FIG 2 Voice Group Call Service VGCS (3GPP TS 42.068)

Note:
VGCS1, VGCS2, VGCS3 = Respective Voice Group Calls with characteristics predefined in the network
A, B, C, D = Service subscribers with group ID a, b, c, d
II, III, IV = Respective areas of a Group Call (Group Call Areas)
w, x, y, z = Dispatchers connected via normal GSM links or external networks Voice Broadcast Service (VBS) 3GPP TS 42.069 V5.0.1 (2002-07)

Note:
VBS1, VBS2, VBS3 = Respective Voice Broadcast Calls with characteristics predefined in the network
A, B, C, D = Service subscriber with group ID a, b, c or d respectively
I, II, III, IV = Group call areas
w, x, y, z = Dispatchers connected via normal GSM links or external networks Group Call Register GCR for Voice Broadcast
(according to 3GPP TS 43.069)

New monitoring for a Voice Group Call or
Voice Broadcast - MC as dispatcher

Change of speaker during monitoring of a group call

METHOD AND DEVICES FOR MONITORING SUBSCRIBERS OF A TELECOMMUNICATIONS NETWORK DURING PARTICIPATION IN GROUP CALL CONNECTIONS

CLAIM FOR PRIORITY

This application is a national stage of PCT/EP2004/050921 which was published on Dec. 9, 2004 and which claims the benefit of priority to German Application No. 103 24 872.2 filed Jun. 2, 2003.

TECHNICAL FIELD OF THE INVENTION

It is known from mobile radio standards, such as 3G-TS33.107v3.0.0R1999 (see www.etsi.org) that calls between two subscribers in a mobile radio network can be intercepted by government offices.

BACKGROUND OF THE INVENTION

In various mobile radio networks (GSM, CDMA 3G, TETRA or others) groups call connections between more than two subscribers are known, in which traffic channels exist between at least one speaker and at least one listener. Examples of group call connections are the Voice Group Call Service (VGCS) according to 3GPP-TS-42.068 (according to which specification there is provision for speaking, listening, speaking and listening subscribers as well as dispatchers (able to speak without voice authorization tokens)) corresponding essentially to a special conference mode and the Voice Broadcast Service (VBS) according to 3GPP-TS42.069 (according to which voice data of a speaker is transmitted to a plurality of listeners in a predefined area (Voice Broadcast Call Area)) corresponding to a broadcast via one or a plurality of cells and/or to predefined subscribers receiving the VBS.

SUMMARY OF THE INVENTION

The object of the present invention is to allow the most extensive monitoring possible of subscribers in a telecommunication network in an efficient manner even when group call connections are used. The object is achieved respectively by the subject matter of the independent claims.

As according to the invention it is determined for the subscriber initiating the setting up of a group call connection (a connection between more than two subscribers) and for further subscribers in the group call connection, whether there is provision for interception and (if there is such provision for at least one of the subscribers in the group call connection) the voice data transmitted via the group call connection is supplied to an interception equipment, more extensive monitoring or interception of subscribers in a telecommunication network is possible than with the prior art, as the prior art allows reliable monitoring of originating connections (e.g. subscribers requesting the setting up of the group call connection) but does not allow efficient monitoring of terminating connections (subscribers participating in the group call as listeners).

To intercept voice data from/for subscribers in a group to be monitored (of which a subscriber to be monitored is part) efficiently, either a copy of the voice data transmitted via the group connection is preferably transmitted in a switching center as a copy to a monitoring device (LEA) based on a group call ID or alternatively a monitoring device is included as a monitoring center (for example just as a listener or dispatcher) in the group connection (preferably without the other subscribers being able to discern this), i.e. extending the group connection to this end by one subscriber (the monitoring center MC).

It can be decided whether at least one subscriber in a group call connection and therefore the group call connection as a whole (all the voice data transmitted via said connection) is to be intercepted in particular by interrogating a home location register or visitor location register of a mobile radio network that contains data relating to said subscriber.

Preferably only group call connections are intercepted in which at least one subscriber to be monitored participates actively in the group connection, i.e. (in particular in response to a prompt) has requested the receipt of voice data and/or transmission of voice data (listener/talker/dispatcher) or automatically has such status for this group call connection based on default settings. In mobile radio networks groups of subscribers can be defined, the subscribers in which can participate in a group call connection (i.e. receive transmitted voice data and/or transmit voice data via traffic channels), by responding positively to a registration prompt for the group call connection or by being provided for automatically for every group call connection set up for this group. Subscribers in a group, who are not available locally or do not respond positively to a prompt to participate in a group connection, are expediently not switched to the traffic channels of the group call connection until they do so (becoming subsequent talkers when they do so later).

Checks on subscribers in a group to establish whether or not they should be intercepted can take place when a group call is set up (i.e. inquiry whether they wish to participate in the group call) and/or cyclically. The check also expediently includes subscribers in the group joining a group call connection later (after the call has been set up). As soon as a subscriber enters the "emission range" of this/their group or is classified as to be intercepted, all voice data transmitted via the group call connection can be intercepted although it does not have to be.

It can be established whether subscribers in a group are to be intercepted based on a comparison of their current location (e.g. by means of a LUP Location Update Ticket) and a predefined spatial service area for a group call (in particular in the form of a Voice Broadcast Call), in which service area voice data of the group call (in particular in the case of a Voice Broadcast Service) is transmitted or can be transmitted according to a default, such that (in particular in the case of a Voice Broadcast Call) a group is only intercepted, if a subscriber is located in the service area of the Voice Broadcast Call provided for, so there may be no need to ask the subscriber whether or not they wish to join the call.

Very efficient identification of subscribers participating actively in a group call (by means of a connection to a traffic channel for voice data) is in particular possible, in that a signaling message (in particular an uplink access request message) is sent to one or all the subscribers in a group for which a group call is possible (in particular in an uplink request message on a voice group call downlink), whereupon the subscribers in the group call identify themselves (for example by means of an IMSI/MSISDN in a response) if they are in transmission range (and in some instances if they are interested in the group call and/or are activated).

If there is a change of speaker in a group (in which generally only one subscriber can be the speaker), the new speaker can be prompted by means of a signaling message to state their identity (in a signaling message), before they become the speaker, whereupon it can be checked whether said speaker should be intercepted.

Voice data to be intercepted is expediently copied in a switching device etc. and sent as CC (Content of Communication) to a (generally government) interception center. Descriptive information relating to said communication can be provided in the IRI (Interception Related Information) packet.

BRIEF DESCRIPTION OF THE DRAWINGS

Further features of the invention will emerge from the claims and the description which follows of an exemplary embodiment.

DETAILED DESCRIPTION OF THE INVENTION

Figure 1:
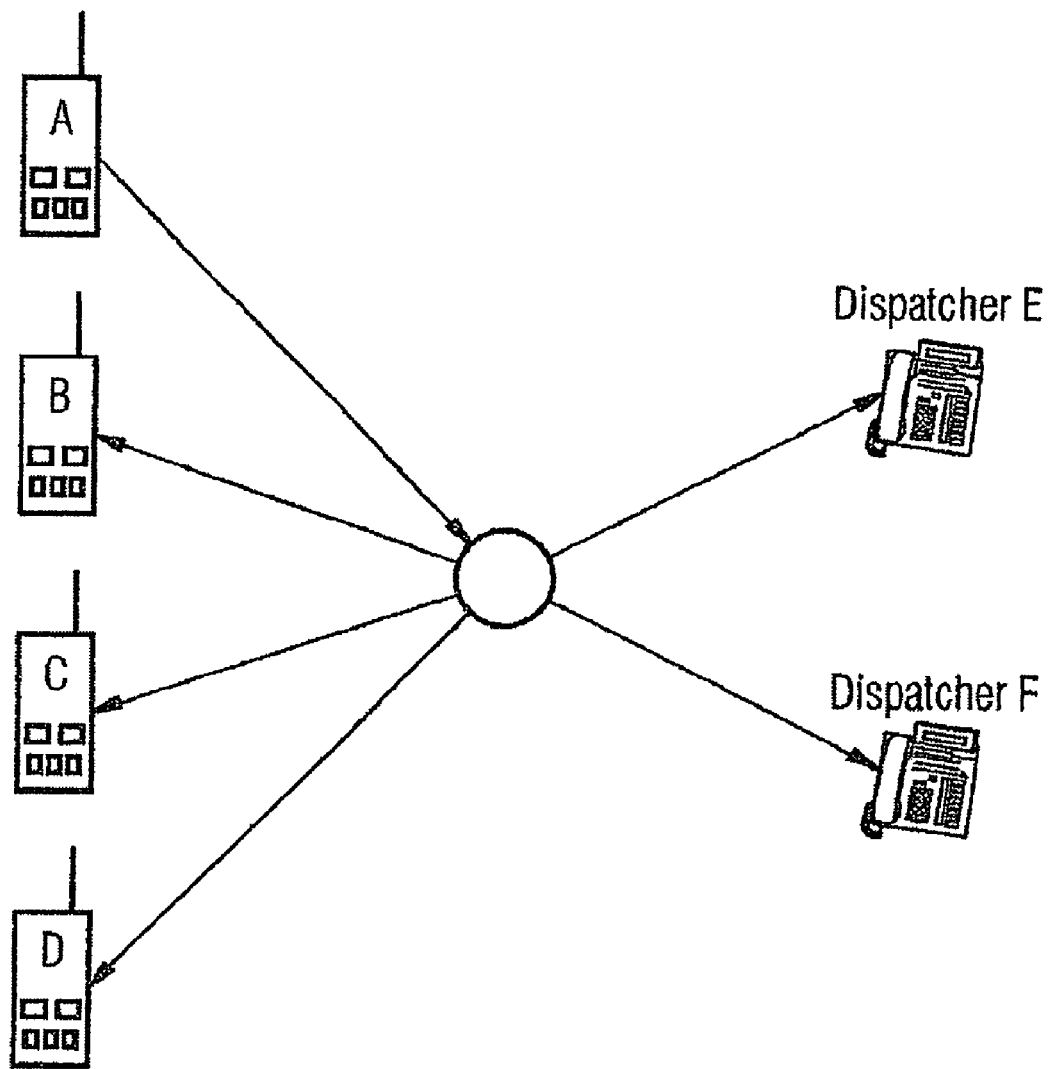
FIG. 1 shows a schematic representation of a known group call.

FIG. 1 shows an example of a group call (Voice Group Call Service/Voice Broadcast Service) in a mobile radio network. The general structure of a mobile radio network is known to the person skilled in the art, for example for a GSM network or 3GPP network from www.etsi.org. In the example in FIG. 1 there is at least one traffic channel respectively between each of the mobile radio stations A, B, C, D and a switching device (shown as a circle) (MSC/SGSN/GGSN/entire core net, etc.) and between dispatchers E, F and the switching device. In the example in FIG. 1 the subscriber A (the mobile station A) is speaking, while the mobile stations B, C, D and the dispatchers E, F simply listen. Therefore the subscriber A requires at least one traffic channel in the uplink direction and the subscribers B-F require at least one traffic channel in the downlink direction.

Figure 2:
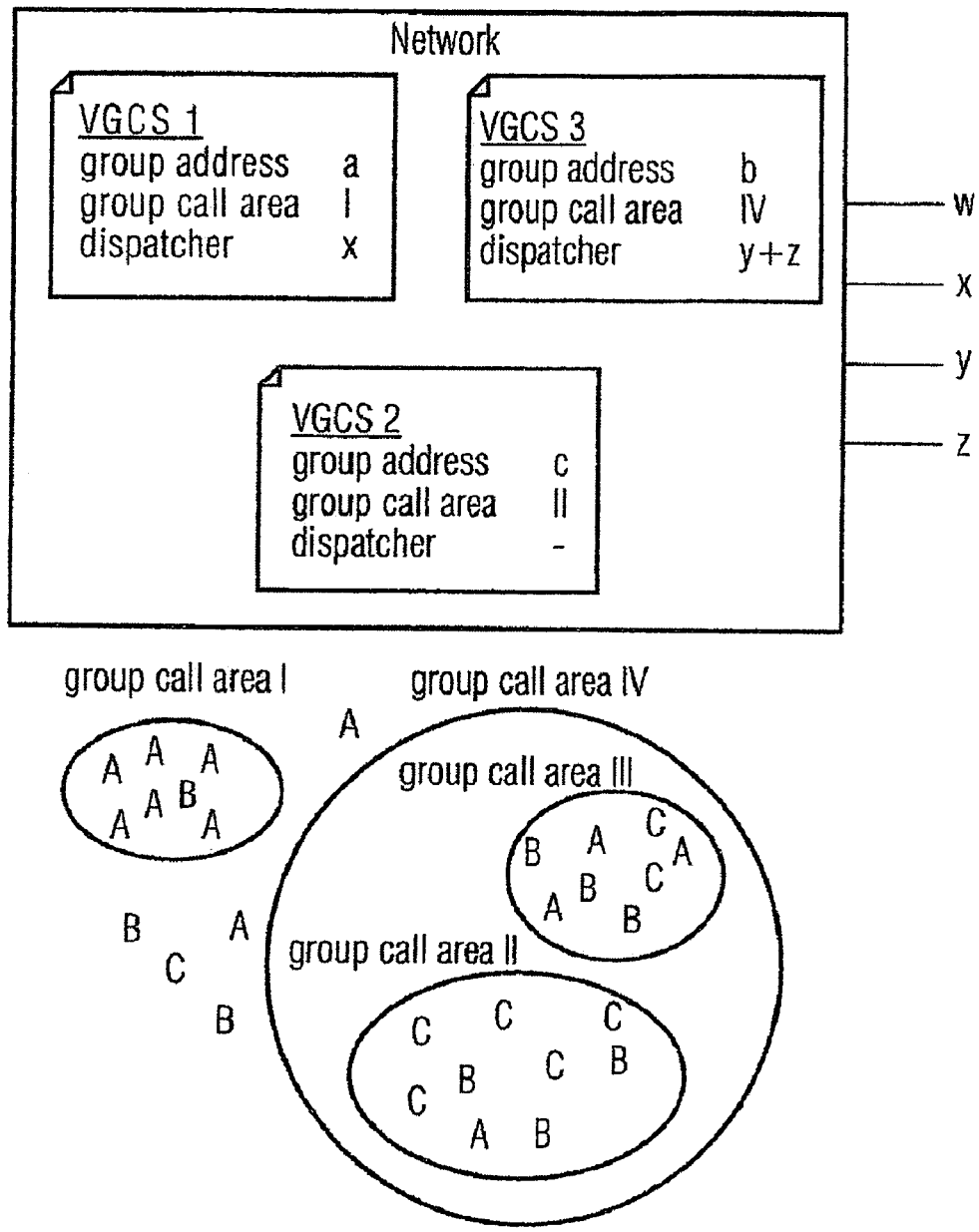
FIG. 2 shows a schematic representation of a known VGCS group call according to 3GPPTS42.068.

FIG. 2 shows an example of a group call connection in the form of a Voice Group Call Service VGCS according to 3GPPTS42.068 (according to which specification there is provision for speaking, listening, speaking and listening subscribers as well as dispatchers (able to speak without voice authorization tokens)), which defines for a group (VGCS1) respectively a group address a (group identity of the group for the switching devices), a group call area I and the identities of dispatchers x for this group. The group addresses a therefore indicate all the service subscribers, who are potential subscribers in a group call connection and can be prompted by a signaling to participate in the group call connection before a group call connection is set up. A group call area I can define a geographical area such as one or a plurality of radio cells or radio cell sectors. Dispatchers x are potential subscribers (i.e. according to the invention also an interception equipment), who can for example also be included in group call connections via GSM or external networks irrespective of their location.

If a group call VGCS according to 3GPPTS42.068 is set up, the subscribers in the group call are asked whether they wish to participate and those who wish to participate are connected together by means of traffic channels in the uplink and/or downlink direction, with the possibility of providing for changing speaker roles.

Figure 3:
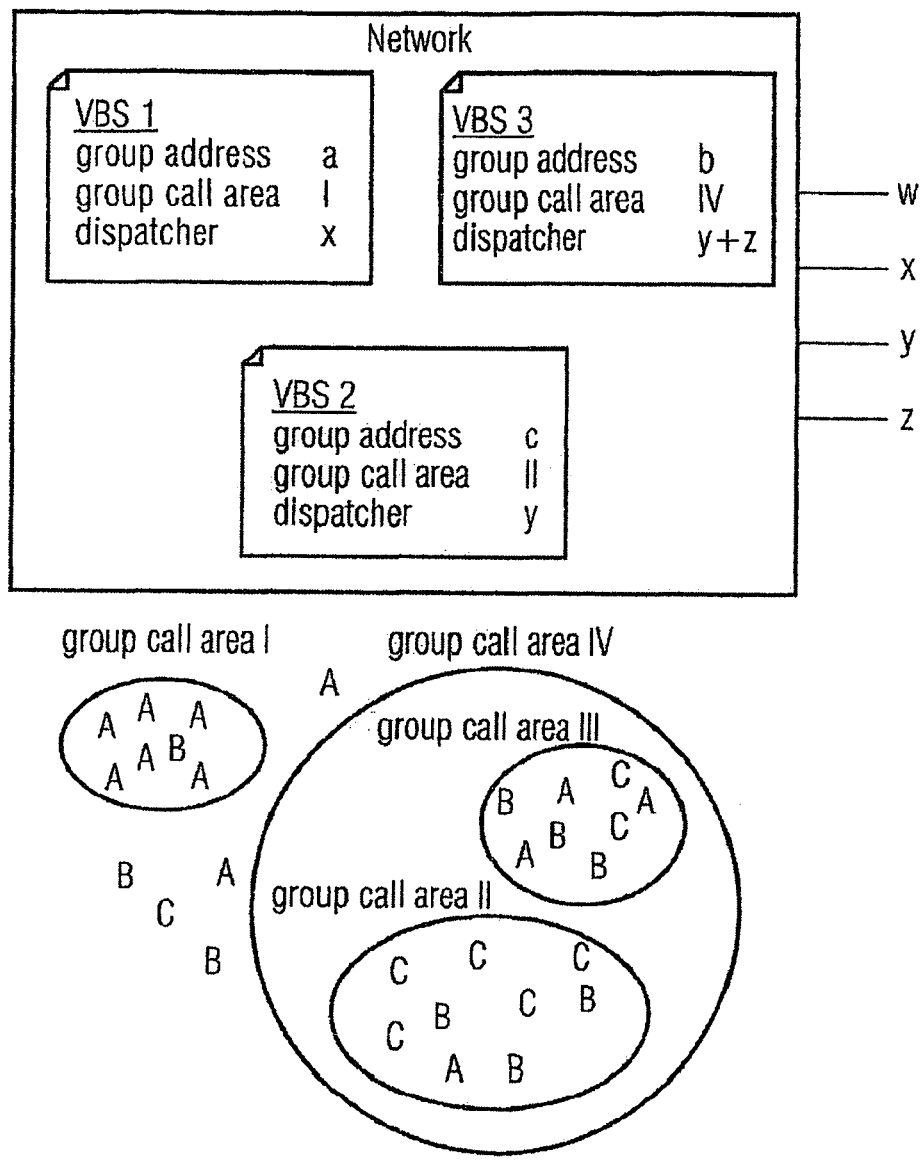
FIG. 3 shows a schematic representation of a known VBS group call according to 3GPPTS42.069.

FIG. 3 shows a group call connection in the form of a Voice Broadcast Service VBS according to 3GPPTS42.069 for example. With this service voice data is only transmitted in predefined areas (Group Call Areas I etc.), in some instances only if at least one subscriber from a subscriber list for a group (e.g. A) is located in the area (Group Call Area) of the group call.

Figure 4:
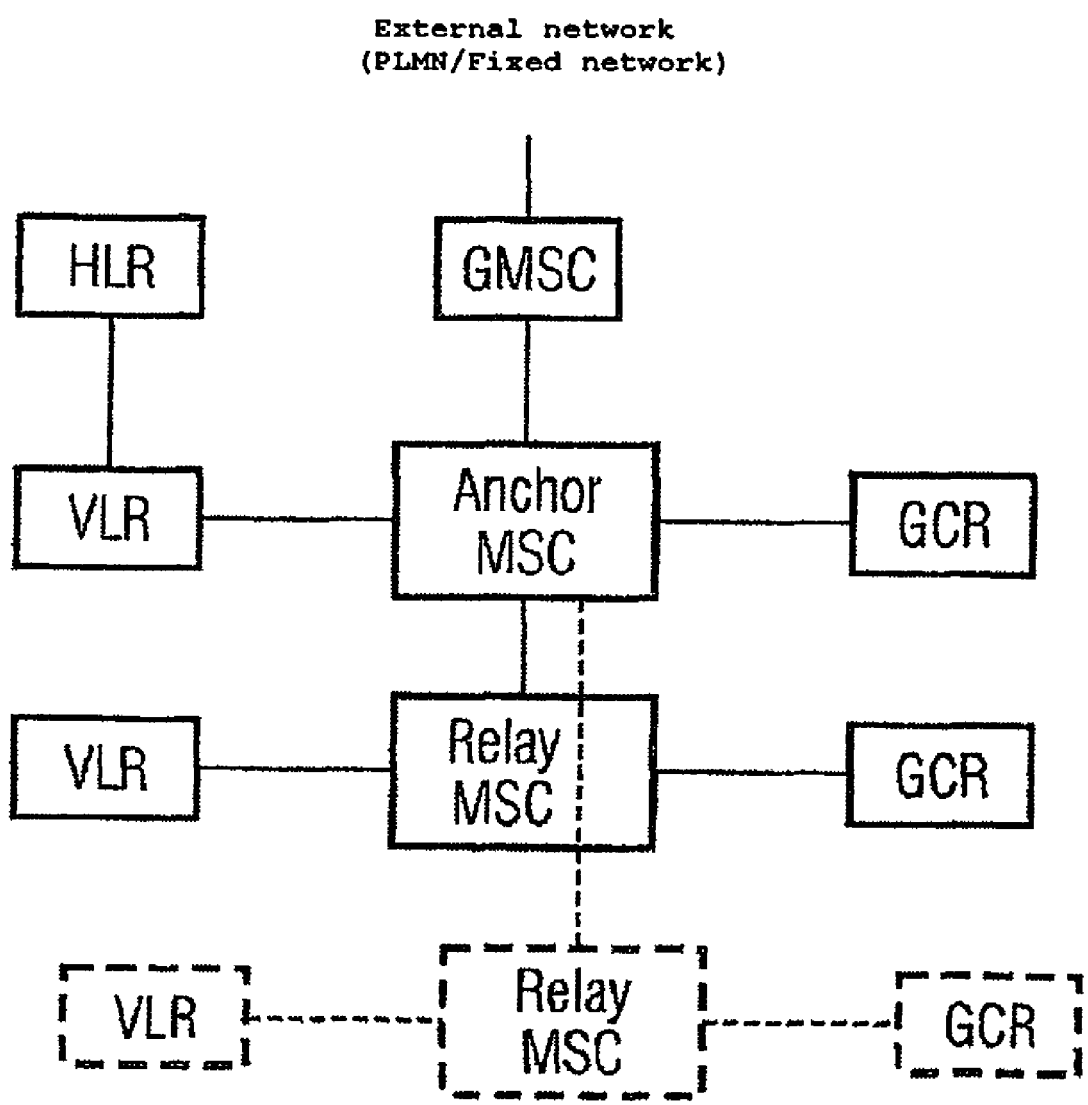
FIG. 4 shows a group call register GCR.

FIG. 4 shows a Group Call Register GCR, in which data relating to group calls, such as the group call area, potential subscribers in the group call, dispatchers, etc., can be stored, the GCR being able to be accessed by anchor devices, MSCs and/or other switching devices or telecommunication network components.

Figure 5:
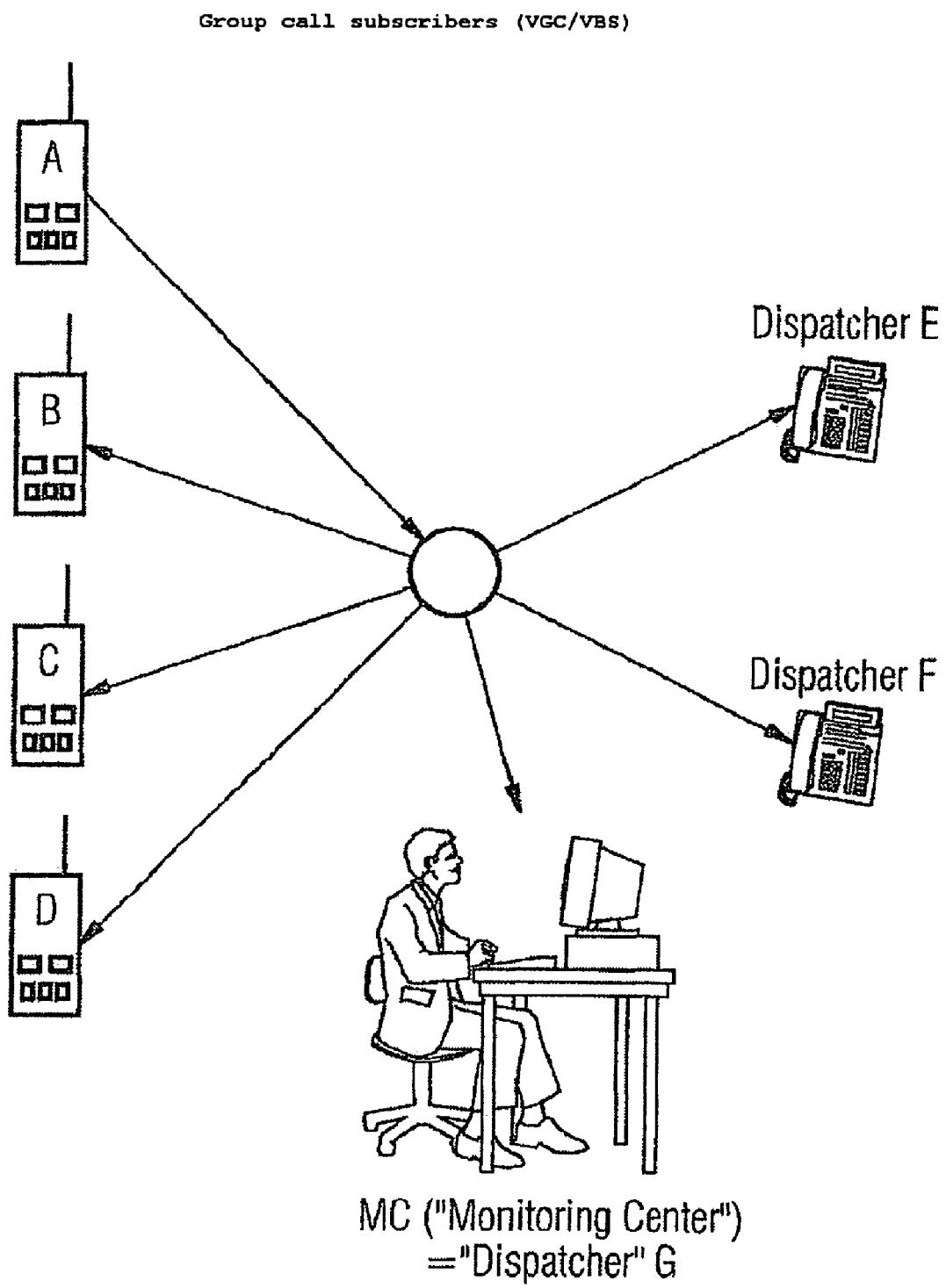
FIG. 5 shows a claimed monitoring situation with an intercepter/dispatcher.

FIG. 5 shows a claimed monitoring of a group call, in which a monitoring device (MC=Monitoring Center) is included in a group call as a subscriber (expediently without the subscribers being informed of this), in particular as a dispatcher, as known per se from 3GPPTS42.069 or 3GPPTS42.068 (dispatcher: subscriber connected via a mobile radio network or fixed network, who can speak in some instances even without being assigned a speaker role and who can receive). As a result this interception equipment MC in FIG. 5 receives all voice data transmitted via voice channels from or to one of the (active) subscribers A-F in the group call connection via a switching device or switching devices (shown as a circle in the center) and can forward this to an interception center, for example of a government office.

Figure 6:
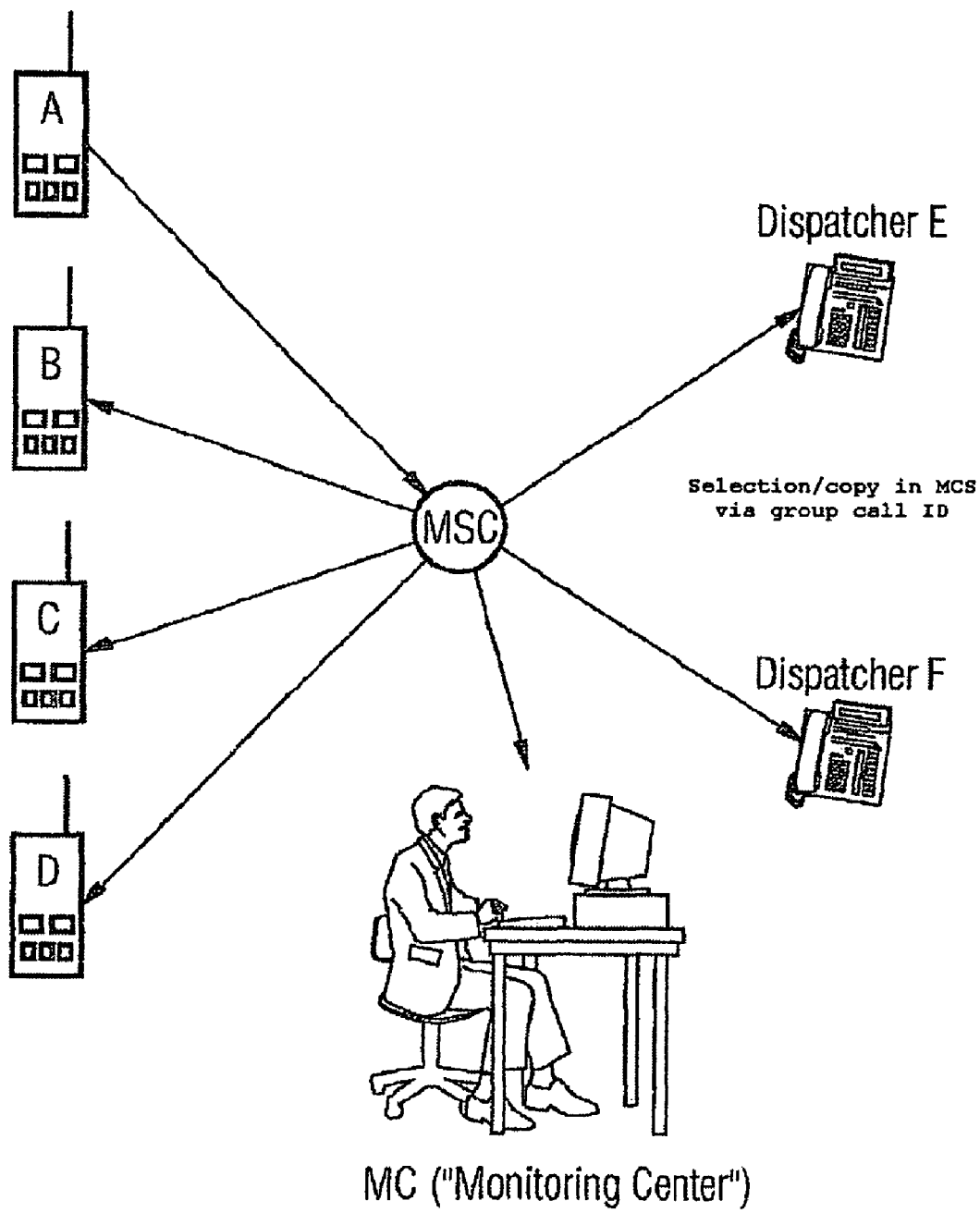
FIG. 6 shows a claimed monitoring situation by means of group call ID monitoring in a switching device.

FIG. 6 shows a further claimed example of an interception equipment, in which voice data transmitted via a switching device ("MSC"/GGSN/SGSN/etc.) between the subscribers A-F (or A-D) in the group call connection (group call) is copied and transmitted as a copy (or alternatively as the original) from a switching device to a monitoring device MC, which can forward it to a government interception center.

Figure 7:
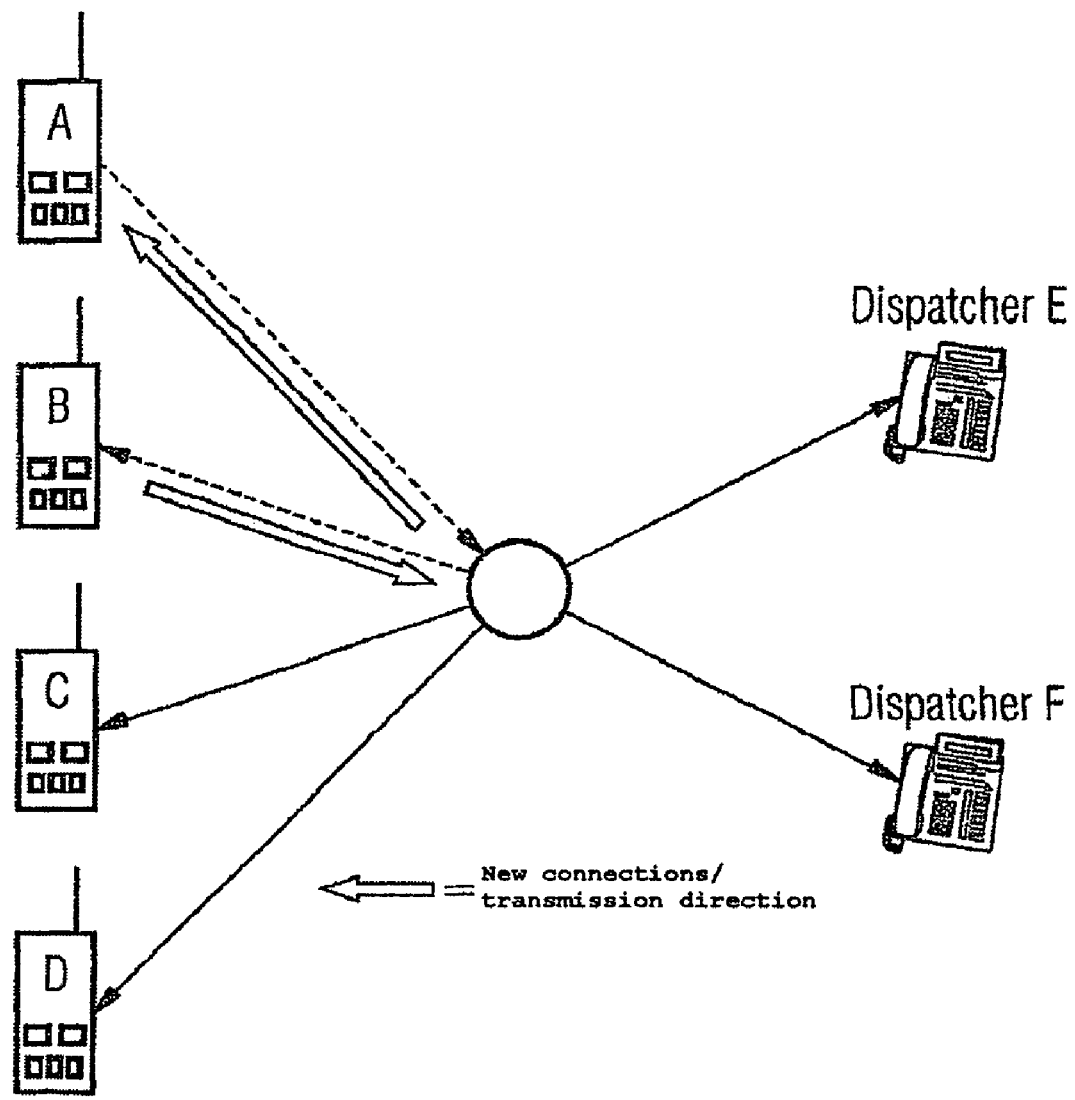
FIG. 7 shows a change of speaker during monitoring of a group call.

FIG. 7 shows a change of speaker during monitoring of a group call, which can be the trigger for determining the identity of the speaker and checking whether said speaker is to be monitored (and therefore whether the voice data and/or other data (e.g. image data) of the group call connection is to be intercepted). Details relating to the "administrative" process of checking (before active monitoring) whether monitoring (interception) should take place:

If the voice data etc. transmitted for a specific group call ID is to be monitored in a switching device, it is expedient to identify the respective group IDs (statically, e.g. at the start, or dynamically at time intervals). A subscriber register (VLR/HLR) determines the association of a subscriber with the group IDs of groups. Subscriber registers can in particular be home location registers (HLR) of a mobile radio network in respect of subscribers registered there. In the case of roaming subscribers (telecommunicating in mobile radio networks other than their home network) it is possible to check group association in visitor location registers (VLR) visited by subscribers.

These group IDs (group identity data) could be deselected by a subscriber on the SIM, in other words the subscriber is a member of said group in the HLR and on the SIM but does not listen to the calls (therefore does not necessarily have to be monitored). It is therefore expedient to identify the "active" (listening and/or speaking) subscribers for the group IDs (e.g. at the start of a group connection and/or dynamically at time intervals:

In the home location register HLR all entries corresponding to the group ID to be monitored are searched accordingly and identified as optional partners and supplied to the monitoring devices as IRI (Intercept Related Information) at the HI2 (Handover Interface 2).

it is also possible to search for the corresponding group IDs in the visitor location registers VLR (only possible in the corresponding PLMN) visited by subscribers in the telecommunication network, as in the HLR (with the above restriction).

The dispatchers input as subscribers in a group call are read from the register GCR and supplied to an interception center as IRI via an HI2 interface.

An investigation of the existing connections is optional, as this is generally not prescribed for CS connections. A switching device (MSC) uses the status flag indication in the GCR to determine the current (ongoing) group/broadcast calls with the defined group IDs. This information is supplied via HI2/IRI. If there are two active groups, the priority indicators can be used to decide the group in which the monitored subscriber is participating. If two groups of equal priority should be active, it is not possible to decide the group in which the monitored subscriber is listening. Notification of both groups is however possible.

Verification whether a subscriber is to be intercepted: A switching device (MSC) sends an uplink access request in an uplink free message on the voice group call channel downlink. The mobile stations (=subscribers) should send back an uplink access request including data representing their identity (IMSI/MSISDN). This allows the required subscriber to be identified. It can then be decided whether monitoring should be terminated (no monitored parties participating in the group call connection) or continued, as a monitored party may participate later.

Identification of a Subsequent Talker:

A subsequent talker (a subscriber who later participates in an already existing group call connection) should send their IMSI/MSISDN to a telecommunication network, when they wish to have an uplink (to transmit the voice data they are sending). The message uplink request should thereby include identity details. It can then be decided whether monitoring should be terminated (no monitored parties participating in the group call connection) or continued, as a monitored party may participate later.

What is claimed is:

1. Method for intercepting subscribers in a telecommunication network, characterized in that it is determined for the subscriber (A) of a group call connection initiating the setting up of a group call connection between more than two subscribers (A-F) and for further subscribers (B-D/B-F) in the group call connection, whether there is provision for interception and at least one of the subscribers (B-F), and if there is provision for intercepting at least one (B) of the subscribers (B-D/B-F), voice data transmitted via the group call connection is supplied to an interception equipment (MC).

2. Method according to claims 1, characterized in that in a switching center (MSC) voice data to be intercepted is selected from voice data to be transmitted by the switching center (MSC) based on information representing the identify (group call ID) of the group connection and this voice data to be intercepted is transmitted to a monitoring device (MC/LIA).

3. Method according to claims 1, characterized in that all the voice data transmitted in a group call connection is intercepted, if at least one subscriber in the group call connection is to be monitored.

4. Method according to claims 1, characterized in that an interception equipment is defined as a subscriber (dispatcher) in the group call connection, receiving all the voice data transmitted via the group call connection, preferably without this being signaled to the other subscribers in the group call connection.

5. Method according to claims 1, characterized in that a check is carried out for subscribers in a group call connection whether they are to be intercepted by interrogating a subscriber register (HLR/VLR) of a mobile radio network.

6. Method according to one claims 1, characterized in that subscribers to be intercepted or their group call connection are only monitored, if they have requested the receipt of voice data and/or the transmission of voice data for a group call connection.

7. Method according to claims 1, characterized in that the check whether subscribers are to be intercepted takes place when a group call is set up and/or repeatedly at time intervals.

8. Method according to claims 1, characterized in that the check whether a subscriber is to be intercepted also takes place when a further subscriber joins an existing group call connection later.

9. Method according to claims 1, characterized in that subscribers in a group call connection to be intercepted are subscribers, for whom a comparison of their current location (LUP) and a spatial service area (group call area) in which voice data of the group call is transmitted, as predefined for a group call, shows that the subscriber can receive or is receiving voice data based on their current location.

10. Method according to claims 1, characterized in that the subscribers in a group or a group call are prompted to identify themselves (IMSI/MSISDN) by a means of a signaling message to a subscriber (uplink free message/uplink access request), to determine whether a subscriber to be monitored is participating in a group call connection.

11. Method according to claims 1, characterized in that voice data of a group call connection is only intercepted, if a subscriber to be intercepted is participating in a group call connection.

12. Method according to claims 1, characterized in that if the speaker in a group call connection changes, the new speaker is prompted to relay their identity (FIG. 7), before they become the new speaker, and that their identity is relayed and/or it is determined whether they should be monitored.

13. Method according to claims 1, characterized in that intercepted voice data is sent in an IRI packet to an interception center.

14. Method according to claims 1, characterized in that the telecommunication network is a mobile radio network, preferably a cellular mobile radio network, and that subscribers are mobile stations.

15. Method according to claims 1, characterized in that a group call is a voice broadcast or a voice group call.

16. Method according to claims 1, characterized in that it is also determined for the subscriber (A) initiating the setting up of a group call connection, whether there is provision for intercepting said subscriber (A) and, if there is provision for intercepting said subscriber (A), voice data transmitted via the group connection is supplied to an interception center (MC).

17. Device for implementing the method according to claims 1.

18. Device, in particular according to claim 17, characterized in that the device (MSC) is configured to send copies of voice data based on a group connection identity (group call ID) to an interception center (MC).

19. Device according to claim 17, characterized in that the device (MSC) is configured to send voice data sent via the group call connection to an interception equipment as a subscriber in a group call connection to be monitored, in particular thereby to define the interception equipment (MC) as a dispatcher.

* * * * *